United States Patent [19]

Mills

[11] Patent Number: 4,957,178

[45] Date of Patent: Sep. 18, 1990

[54] WEIGH-IN-MOTION SCALE

[75] Inventor: Nigel G. Mills, Worthington, Ohio

[73] Assignee: Toledo Scale Corporation, Worthington, Ohio

[21] Appl. No.: 397,108

[22] Filed: Aug. 22, 1989

[51] Int. Cl.[5] .................... G01G 19/02; G01G 21/24
[52] U.S. Cl. ...................................... 177/134; 177/255
[58] Field of Search ................. 177/154, 255, 134, 135

[56] References Cited

U.S. PATENT DOCUMENTS

| | | | |
|---|---|---|---|
| 3,158,217 | 11/1964 | Johnson | 177/154 X |
| 3,266,585 | 8/1966 | Boadle | 177/154 |
| 4,339,010 | 7/1982 | Malikov et al. | 177/255 X |
| 4,466,501 | 8/1984 | Karpa | 177/255 X |
| 4,535,858 | 8/1985 | Provost et al. | 177/255 X |
| 4,658,923 | 4/1987 | Labarile | 177/255 X |

*Primary Examiner*—George H. Miller, Jr.

[57] ABSTRACT

Apparatus for weighing vehicles in motion includes a base to be anchored to a roadbed below ground level in the path of moving vehicles and a pair of scale platforms mounted on the base for receiving the wheels on the opposite sides of the moving vehicles. Load cells are provided between the base and the platform for producing signals indicating the load applied by each wheel on the platform. A pair of flexure struts is connected between each platform and the base to apply a preload and permit relative movement therebetween in the vertical direction and to resist relative movement in the horizontal direction. The flexure struts extend lengthwise in the direction of traffic flow and are resistant to loads in that direction while being flexible in the vertical direction to permit application of the preload and flexing of the load cells. The dynamic weight signals from the load cells are converted to digital form and operated on to provide information as to the weights of the passing vehicles.

12 Claims, 3 Drawing Sheets

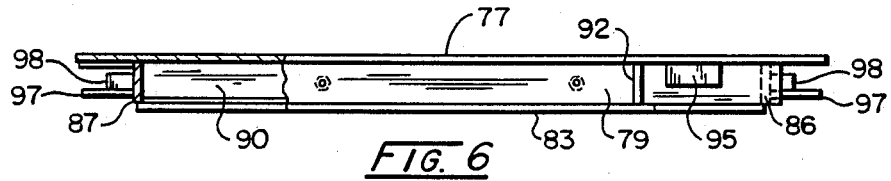
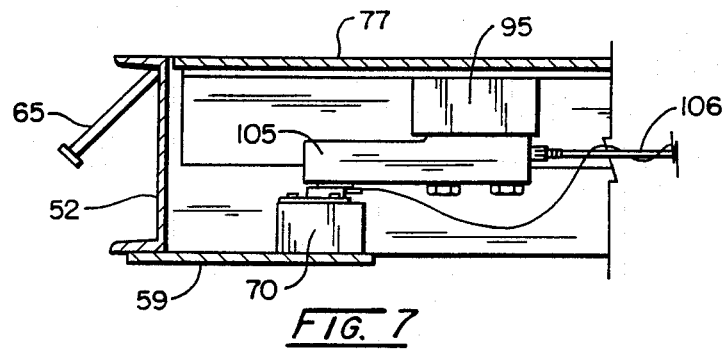
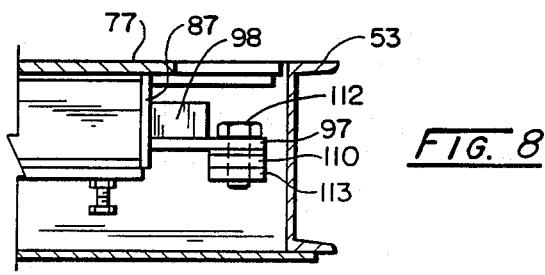
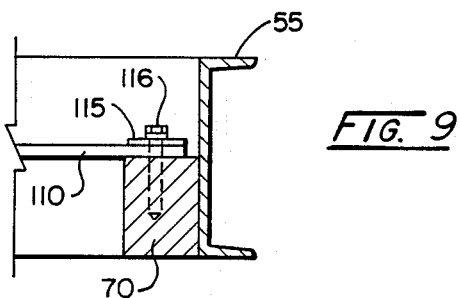

WEIGH-IN-MOTION SCALE

BACKGROUND OF THE INVENTION

This invention relates to weighing apparatus and more particularly to such apparatus for use in weighing vehicles in motion.

The ability to weigh vehicles in motion offers many advantages over static weighing and reliable, reasonably accurate systems for doing so have long been sought. A particularly advantageous use for such systems is to monitor truck traffic as the trucks travel along interstate highways. This has usually been accomplished by requiring trucks travelling on interstate highways to enter weigh stations where they are weighed using static scales. Truck operators may, however, go to considerable lengths to avoid a weigh station for various reasons. This avoidance reduces the amount of data available to regulatory authorities as to truck traffic as well as placing heavy trucks on roads not designed for such traffic.

Weigh-in-motion (WIM) systems offer the ability to monitor a larger number of sites, the ability to monitor truck traffic without truck operators being aware of it (thereby minimizing the scale avoidance problem), reduced cost and the provision of information as to the wheel loads being imposed on the roadway. Disadvantages of known WIM systems include relative inaccuracy in comparison with static scales and difficulties in installation and maintenance of the system. There are also problems associated with calibration of the system to yield static weights from the dynamic weight information.

A WIM system may include a pair of scales installed side-by-side in one lane of an interstate highway, one scale to weigh each wheel on the opposite sides of a truck as it moves over the scales. Alternatively, a single scale may occupy the entire lane to weigh the truck axle. In either case, a scale may typically include a base anchored in concrete beneath the surface of the roadway, a weighing platform level with the surface of the roadway and a number of load cells mounted between the platform and the base to provide a signal indicating the load applied by the wheel or axle passing over the platform.

It will be apparent that such a system is subject to a great deal of abuse, including loads tending to move the platform horizontally with respect to the base in the direction of the moving traffic and loads tending to move the platform vertically off the base. Vehicles moving at highway speeds exert significant suction on the roadway. This upward force is exerted upon the scale platform as the vehicle passes over the scale. A typical way to solve this problem is to make the mass of the platform very large. This solution, however, results in relatively slow system response for obtaining weight information.

Another solution is that the platform be anchored to the base by means of bolts. The bolts cannot, however, be excessively tight and must allow for relative vertical movement between the platform and the base to permit the load cells to flex under load. Such play in the bolts also permits a certain amount of relative horizontal movement between platform and base. Another disadvantage is lack of firm constraint in the vertical direction against forces tending to lift the platform off the base. The "check bolt" arrangements thus allow platform motion with consequent high impact and shock forces. Over time, this may result in shearing of the bolts, much wear and tear on the installation, reduced weighing accuracy and a greater need for regular maintenance.

SUMMARY OF THE INVENTION

The present invention provides a weigh-in-motion scale system and method which substantially eliminates the problems and disadvantages referred to above with current weigh-in-motion systems.

According to the present invention there is provided apparatus for weighing vehicles in motion, including a base for anchoring to a roadbed below ground level in the path of moving vehicles and a platform for receiving the wheels of the moving vehicles. Load cell means are provided between the base and the platform for providing signals indicating the load applied by the wheels on the platform. Means is connected between the platform and the base to apply an initial load, or preload, therebetween and permit relative movement in the vertical direction and to resist relative movement in the horizontal directions.

Preferably, such means includes at least one flexure arm, or strut, extending horizontally between the platform and the base in the direction of traffic flow and applying a preload to the platform. The arm is stiff in the direction of its length to resist relative horizontal motion between the platform and the base and is flexible in the vertical direction to permit application of the preload and relative vertical movement between the platform and base.

By presetting a sufficient downward force in the flexible arm to overcome the upward force produced by passing vehicles, the platform may be relatively low mass and consequently yield a faster system response.

The use of flexures to resist horizontal forces while remaining weak to vertical forces is well known. In the present invention, settling time and overall stability of the scale platform are significantly improved by increasing the vertical stiffness of the flexure and preloading the platform by vertical deflection of the flexure.

BRIEF DESCRIPTION OF THE DRAWINGS

FIG. 6 is a view on the line 6—6 of FIG. 5;

FIG. 7 is a partial vertical sectional view on line 7—7 of FIG. 2;

FIG. 8 is a partial vertical sectional view on the line 8—8 of FIG. 2; and

FIG. 9 is a partial vertical sectional view on the line 9—9 of FIG. 2.

DESCRIPTION OF A PREFERRED EMBODIMENT

Figure 1:
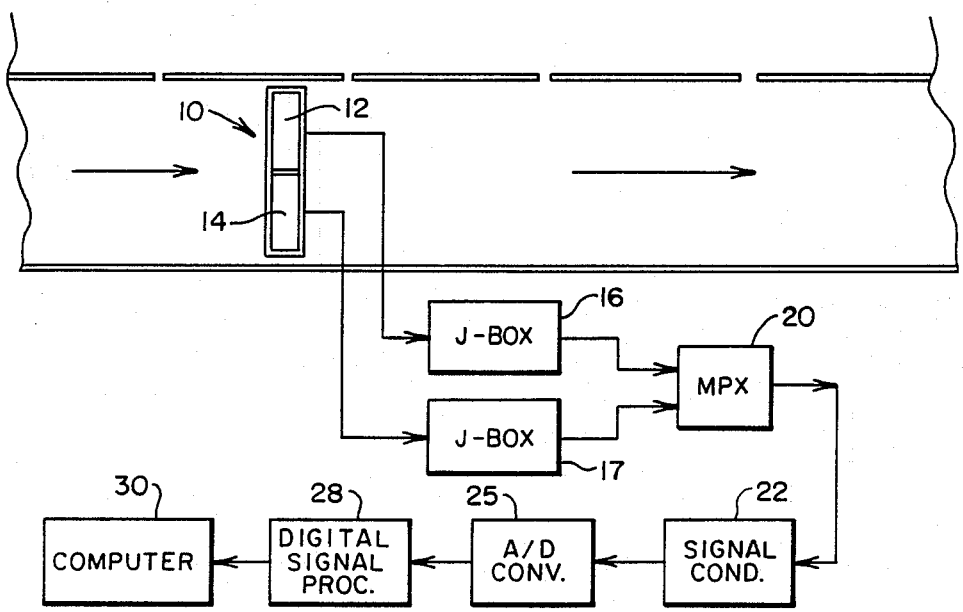
FIG. 1 is a block diagram of a weigh-in-motion system embodying the present invention.

Referring initially to FIG. 1, a weigh-in-motion system embodying the present invention includes a scale assembly generally indicated at 10 installed in, for example, one lane of an interstate highway in the path of vehicles moving in the direction of the arrow. Scale assembly 10 includes a left-side wheel scale 12 and a right-side wheel scale 14 positioned in the path of the respective wheels of an oncoming truck or other vehicle to be weighed. A single scale occupying the entire width of the lane to weigh vehicle axles could, of course, be used instead of a pair of wheel scales.

Each wheel scale 12, 14 includes a number of load cells which provide electrical signals to junction boxes 16, 17, respectively, where the signals are combined in a known manner to provide analog signals indicating dynamic wheel loads imposed on scales 12 and 14. The signals from junction boxes 16 and 17 are connected to an analog multiplexer 20 and from there to a signal conditioning unit 22 which conditions the signals for input to an analog-to-digital (A/D) converter 25. Each signal is converted by A/D converter 25 to digital form and provided to a digital signal processing unit 28 for certain operations. The signals from processor 28 are provided to a computer 30.

The system of FIG. 1 constitutes a sampled data system. Wheel scales 12 and 14 are positioned and sized so that the two opposite wheels of a truck will pass over the respective scales and produce an analog dynamic load signal. The signals from the respective wheel scales 12 and 14 are switched in turn by multiplexer 20 to A/D converter 25 which produces a digital sample of the signal. The signals are then provided through processor 28 to computer 30 where various operations and computations can be performed to yield information as to the weight of the passing vehicle as well as other information useful in monitoring of highway loads and use.

Figure 2:
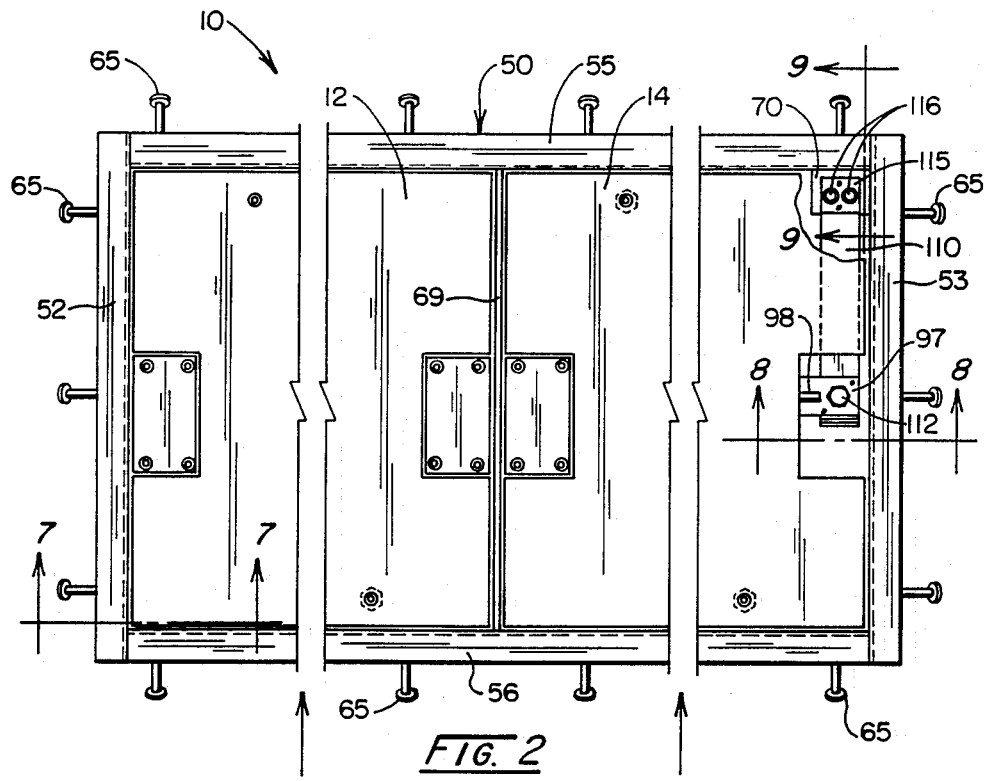
FIG. 2 is a plan view of a weigh-in-motion scale assembly embodying the present invention.
Figure 3:
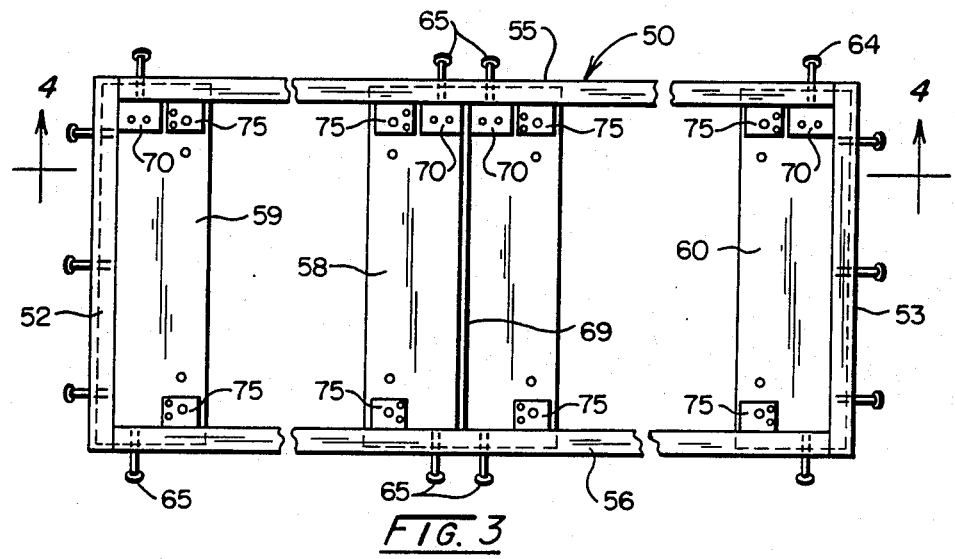
FIG. 3 is a plan view of the base in the assembly of FIG. 2.
Figure 4:
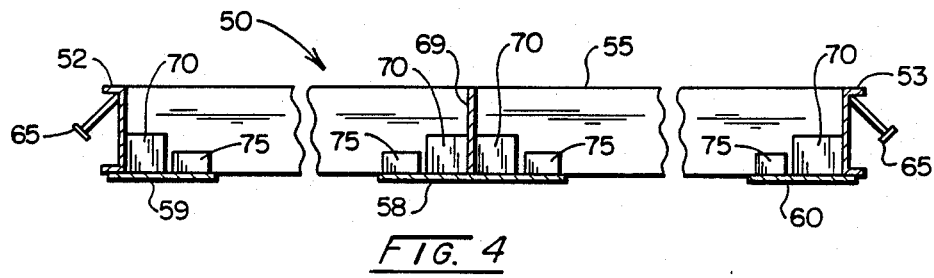
FIG. 4 is a vertical sectional view on line 4—4 of FIG. 3.

Referring now to FIG. 2, the scale assembly 10 includes a base 50 to be anchored in concrete beneath the surface of the highway and supporting the platform wheel scales 12 and 14 of FIG. 1. A set of flexure struts anchor each scale platform 12, 14 to base 50 as shown partially in FIG. 2 for platform 14. As shown in FIGS. 2 to 4, base 50 includes a pair of side channels 52, 53 welded to corresponding end channels 55, 56, a center base plate 58 and two side base plates 59, 60. Concrete anchors 65 are provided at spaced locations around the base to anchor it in concrete below the surface of a highway lane. A vertical support plate 69 extends centrally between end channels 55, 56. The base 50 is symmetrical about the center line of vertical plate 69, the half to the left as viewed in the drawings supporting the scale platform 12 and the half to the right supporting the identical scale platform 14 in a manner to be described below.

A flexure strut attachment block 70 is provided at the exit end of each side base plate 59, 60 and at the exit end of center base plate 58 on each side of vertical plate 69. Blocks 70 are welded or otherwise suitably attached to end channel 56 and/or base plates 58-60. A load pin attachment block 75 is also provided at each end of each side base plate 59, 60 and of center base plate 58 on both sides of vertical plate 69. Blocks 75 may be welded to channels 55, 56. Scale platforms 12, 14 are supported on blocks 75 and anchored to base 50 by flexure struts connected to block 70 as described below.

Figure 5:
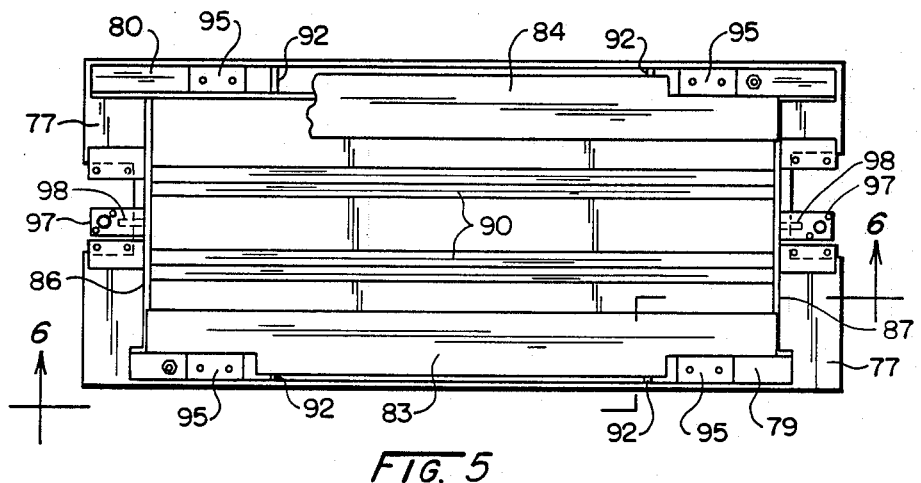
FIG. 5 is a bottom view of one weighing platform of the scale assembly.

As shown in FIGS. 5 and 6, each scale platform 12, 14 includes a top plate 77 mounted on a pair of end angles 79, 80 which extend vertically to bottom plates 83, 84 at each end of the platform. A pair of side plates 86, 87 extend lengthwise of platform 12 between top plate 77 and bottom plates 83, 84. A pair of vertical support plates 90 extend from one side to the other of the platform at its center and a pair of gusset plates 92 are provided at each side of the platform between top plate 77 and bottom plates 83, 84. A load cell mounting bar 95 is welded to each end of each angle bar 79, 80 for connection to load cells as described below. A flexure attaching bar 97 is welded to each side plate 86, 87 for mounting the scale platform onto base 50 through flexure struts in accordance with the present invention as will be described below. Each flexure attaching bar is supported by a vertically extending plate 98 welded or otherwise suitably secured to side plate 86 or 87.

Each scale platform 12, 14 is supported at each of its four corners on base 50 through a load cell beam mounted between mounting bar 95 on the scale platform and load pin attachment block 75 on the base. This mounting arrangement is shown in FIG. 7 where load cell 105 is connected at one end to mounting bar 95 while the other end bears on load pin attachment block 75. When so mounted, a load on a scale platform 12, 14 applied by a wheel of a passing vehicle causes flexing of load cells 105. Strain gages (not shown) produce an analog signal proportional to the load applied which is transmitted through cable 106 and processed in the manner described above in connection with FIG. 1.

As described above, each scale platform 12, 14 must be anchored to the base 50 of the weighing assembly to hold the platform securely in place, but also in such a way as to permit flexing of load cells 105. According to the present invention, that is accomplished in a unique and advantageous manner by one or more (preferably two) flexure struts connected between each scale platform and base 50. Each strut is connected so as to apply a vertical preload to each scale platform to hold it securely in place. FIGS. 2, 8 and 9 show the connection of one of an identical pair of flexure struts between platform 14 and base 50. As shown there, flexure strut 110 is connected at one end to flexure attaching bar 97 of scale platform 14 by bolt 112 and nut 113. The remaining end of strut 110 is clamped to flexure attachment block 70 on base 50 by means of clamp plate 115 and bolts 116 extending into threaded openings in attachment block 70. Flexure attaching bar 97 on the platform is higher than flexure attachment block 70 on the base so that when the bolts 112, 116 are tightened strut 110 is flexed, and a downward force is applied to the platform. The amount of the preload force may be adjusted by using washers with bolt 112 and nut 113. The total amount of this vertical preload should, of course, be sufficient to overcome the forces generated by moving vehicles tending to lift the platform off the base. For a platform weighing about 600 pounds, a preload of about 700 pounds per strut has been found satisfactory which results in a per platform load on the base of about 2000 pounds.

The desired preload may be preset at the factory, an advantage of the present invention. To do so, the scale system is assembled at the factory and the desired preload for each strut 110 applied by washers or shims of the appropriate thickness inserted between bolts 112 and nuts 113. The same preload may then be applied in the field by using washers or shims of the same thickness.

Struts 110 and its mates extend in the direction of, and are loaded lengthwise by, traffic flow. The struts strongly resist forces on a scale platform in either direction parallel to the traffic flow produced by vehicle braking or acceleration. The struts are preferably mounted at the exit end of the weighing assembly so as to be loaded lengthwise in compression by the forces produced in vehicle braking. The struts likewise resist movement of a scale platform in directions transverse to the direction of traffic flow, but need be much less stiff in the transverse directions. In the vertical direction the struts apply a preload to hold the platform firmly in place. While flexed for the preload, the struts remain much more flexible than load cells 105 and permit the load cells to flex without bypassing any significant portion of the load applied to the load cells.

The flexure struts thus provide a means of holding the platform in place to strongly resist movement parallel to the direction of traffic flow as well as vertically while permitting relatively free vertical movement of the scale platforms for weighing purposes. The overall stability and the settling time of the scale platform is substantially improved by increased vertical stiffness of the struts and the preload applied by means of the struts.

It will be apparent to those skilled in the art that the flexure struts may be arranged and connected between scale platform and base in ways other than as specifically described herein and retain the advantages and objectives of this invention.

What is claimed is:

1. Apparatus for weighing vehicles in motion comprising a base for anchoring to a roadbed in the path of moving vehicles, a weighing platform mounted on said base for receiving the wheels of moving vehicles, load cell means between the base and the platform for providing signals indicating the loads applied by the wheels on the platform, and means connected between the platform and the base to apply a vertical preload and to resist relative horizontal movement between the base and the platform.

2. Apparatus as claimed in claim 1 wherein said preload means includes a flexure arm extending lengthwise between the platform and the base, said arm resisting relative horizontal movement between the platform and the base and flexing to permit relative vertical movement therebetween, and means connecting said arm to apply a vertical preload between the platform and base.

3. Apparatus as claimed in claim 2 including means for setting said vertical preload to a predetermined amount.

4. Apparatus as claimed in claim 2 including a second flexure arm extending lengthwise between the platform and the base.

5. Apparatus as claimed in claim 1 wherein said preload means is connected between the platform and the base parallel to the direction of traffic flow, and including means for flexing said flexure means to apply a downward preload to said platform.

6. Apparatus as claimed in claim 5 including means for flexing said preload means a predetermined amount to apply a predetermined preload between said platform and base.

7. Apparatus as claimed in claim 5 wherein said preload means is connected between the vehicle exit end of the weighing platform and the vehicle exit end of the base, whereby vehicle deceleration over said platform tends to compress the preload means.

8. Apparatus for weighing vehicles comprising a base for anchoring to a roadbed, a scale platform mounted on the base for receiving the wheels of vehicles, load cell means between the base and the platform for providing signals indicating the load applied by the wheels on the platform, at least one flexure strut connected lengthwise between the platform and the base parallel to the direction of vehicle movement onto and off of said platform, said strut having a length greater than its thickness so as to be resistant to loads applied along its length and relatively flexible to loads applied transverse to its length, and means for using said flexure strut to vertically preload said platform.

9. Apparatus as claimed in claim 8 including means for flexing the flexure strut to apply a predetermined preload on said platform.

10. In a vehicle scale including a base to be installed in a roadbed, a weighing platform mounted on said base to receive a vehicle wheel, and load cell means between the weighing platform and the base to produce a signal indicative of the load applied by the wheel on the platform, a method of connecting the weighing platform to the base comprising the steps of connecting a strut to extend lengthwise between the platform and the base in the direction of vehicle movement on to and off the platform, said strut being resistant to forces applied along its length and relatively flexible to forces applied transverse to its length, whereby said strut resists relative horizontal movement between the platform and the base and permits relative vertical movement therebetween, and using the strut to vertically preload the platform.

11. A method as claimed in claim 10 including the step of flexing the strut a predetermined amount to apply a predetermined preload on the platform.

12. A method as claimed in claim 10 including the step of flexing the strut to preload the platform.

* * * * *